(12) United States Patent
Sanguinetti et al.

(10) Patent No.: US 12,719,581 B2
(45) Date of Patent: Aug. 25, 2026

(54) METHODS AND APPARATUSES FOR AUTOMATIC CONFIGURATION OF PORTS IN AN OPTICAL NETWORK

(71) Applicant: Telefonaktiebolaget LM Ericsson (publ), Stockholm (SE)

(72) Inventors: Davide Sanguinetti, Genoa (IT); Roberto Pacchetti, Genoa (IT); Fabrizio Stefanelli, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 707 days.

(21) Appl. No.: 18/027,741

(22) PCT Filed: Sep. 23, 2020

(86) PCT No.: PCT/EP2020/076533
§ 371 (c)(1),
(2) Date: Mar. 22, 2023

(87) PCT Pub. No.: WO2022/063396
PCT Pub. Date: Mar. 31, 2022

(65) Prior Publication Data

US 2023/0379061 A1 Nov. 23, 2023

(51) Int. Cl.
*H04B 10/60* (2013.01)
*H04B 10/2575* (2013.01)
(Continued)

(52) U.S. Cl.
CPC ..... *H04B 10/516* (2013.01); *H04B 10/25759* (2013.01); *H04B 10/2575* (2013.01);
(Continued)

(58) Field of Classification Search
CPC ............ H04B 10/516; H04B 10/25759; H04B 10/2575; H04B 10/5161; H04B 10/60; H04L 25/0262; H04L 1/0046
(Continued)

(56) References Cited

U.S. PATENT DOCUMENTS 10,863,386 B1 * 12/2020 Anand .................. H04J 3/0647
2009/0003301 A1 * 1/2009 Reial ..................... H04L 1/1829
370/342
(Continued)

FOREIGN PATENT DOCUMENTS

CN 102340352 A 2/2012
CN 111385678 A 7/2020
(Continued)

OTHER PUBLICATIONS

Wang et al, CN111698708A, Sep. 22, 2020, CNIPA., All Document. (Year: 2020).*
(Continued)

*Primary Examiner* — Dibson J Sanchez
(74) *Attorney, Agent, or Firm* — Murphy, Bilak & Homiller, PLLC

(57) ABSTRACT

Embodiments described herein provide methods and apparatuses for providing automatic configuration of ports of a first transport equipment. A method is provided in a first transport equipment for an optical network for communicating with a second transport equipment in an optical network to transmit traffic between a local terminal device and a remote terminal device. The method comprises receiving traffic from a local terminal device intended for a remote terminal device; attempting to decode the traffic according to a first coding type to generate decoded traffic; determining an alignment status of the decoded traffic; and responsive to an alignment status of the decoded traffic indicating a loss of
(Continued)

frame, attempting to decode the traffic according to a second coding type.

22 Claims, 5 Drawing Sheets

(51) Int. Cl.
*H04B 10/516* (2013.01)
*H04L 1/00* (2006.01)
*H04L 25/02* (2006.01)

(52) U.S. Cl.
CPC .......... *H04B 10/5161* (2013.01); *H04B 10/60* (2013.01); *H04L 1/0046* (2013.01); *H04L 25/0262* (2013.01)

(58) Field of Classification Search
USPC .................................. 398/115–117, 202–214
See application file for complete search history.

(56) References Cited

U.S. PATENT DOCUMENTS

2012/0301138 A1* 11/2012 Tolliver ................. H04B 10/40 398/25
2015/0304890 A1* 10/2015 Song ......................... G06F 9/48 370/328
2017/0063491 A1* 3/2017 Bruckman ............ H04J 3/0658
2017/0127363 A1* 5/2017 Tamamoto ....... H04B 10/25752
2017/0279593 A1 9/2017 Mittal et al.
2020/0213009 A1* 7/2020 Okada ................ H04B 10/5161
2020/0252980 A1* 8/2020 Anand .................. H04W 92/12
2022/0060312 A1* 2/2022 Xu .......................... H04J 14/02

FOREIGN PATENT DOCUMENTS

CN 111698708 A 9/2020
WO 2018197011 A1 11/2018
WO 2020159846 A1 8/2020
WO 2021055237 A1 3/2021

OTHER PUBLICATIONS

Unknown, Author , “IEEE Standard for Ethernet”, IEEE Std 802.3™—2018 (revision of IEEE Std 802.3-2015), Jun. 14, 2018, 1-6231. (Split into six parts).
Unknown, Author , “Common Public Radio Interface (CPRI); Interface Specification”, CPRI Specification V7.0, Oct. 9, 2015, 1-128.
Unknown, Author , “Common Public Radio Interface; eCPRI Interface Specification”, eCPRI Specification V2.0, May 10, 2019, 1-109.
Unknown, Author , “IEEE Standard for Radio over Ethernet Encapsulations and Mappings”, IEEE Std 1914.3™—2018, Sep. 27, 2018, 1-77.

* cited by examiner

METHODS AND APPARATUSES FOR AUTOMATIC CONFIGURATION OF PORTS IN AN OPTICAL NETWORK

TECHNICAL FIELD

Embodiments described herein relate to methods and apparatuses for configuring ports in an optical network. In particular, a method in a first transport equipment is provided that automatically determines a coding type to decode traffic received from a local terminal device.

BACKGROUND

Data traffic that is exchanged remote radio units and base band units may have different data rates and protocols. Newer RRUs and BBUS may be configured to communicate both using Common Public Radio Interface (CPRI) and enhanced CPRI (eCPRI) standards. The CPRI standard includes a rate negotiation procedure. The eCPRI standard relies on the Ethernet physical layer.

It may be desirable for a transport network for use with radio terminal devices, such as a FrontHaul network, to be transparent to these changes of data rates in the received traffic from the terminal devices to ensure reliable communication between RRUs and BBUs.

When data traffic is mapped (encapsulated) on the line, the two transport equipment connecting the two terminal devices via the optical network must be transparent to the terminal devices, as if the two terminal devices are directly connected. FIG. 1*a* illustrates a connection between a local terminal device and a remote terminal device via a first transport equipment and a second transport equipment. FIG. 1*b* illustrates how the local terminal device and remote terminal device view the connection between them.

In order to be transparent, the transport equipment may have to quickly adapt to changes in the behaviour of the two terminal devices. For example, adapting to any data rate changes and to the switching on or off of an optical module.

When using Radio over Ethernet standard, for example, data from the terminal device is monitored, and the mapping is be changed when the baseband changes data rate.

An automatic reconfiguration of client ports on the transport equipment may also be useful to avoid transport equipment manual configuration. Usually manual configuration is required in order to set the correct client type for the ports on the transport equipment.

Current solutions for automatic configuration apply to CPRI rate negotiation only, and rely on a proper master-slave configuration of the transport equipment. In other words, the transport equipment is configured differently when connected to a Baseband ("master") or a Radio ("slave"). The negotiation is performed based on clients of the same type, e.g. CPRI; it is currently not possible to adapt the transport equipment automatically to reconfigure for other client types such as Ethernet or FibreChannel.

SUMMARY

According to some embodiments there is provided a method in a first transport equipment for an optical network for communicating with a second transport equipment in an optical network to transmit traffic between a local terminal device and a remote terminal device. The method comprises receiving traffic from a local terminal device intended for a remote terminal device; attempting to decode the traffic according to a first coding type to generate decoded traffic;

determining an alignment status of the decoded traffic; and responsive to an alignment status of the decoded traffic indicating a loss of frame, attempting to decode the traffic according to a second coding type.

According to some embodiments there is provided a first transport equipment for an optical network, wherein the first transport equipment is configured to communicating with a second transport equipment in an optical network to transmit traffic between a local terminal device and a remote terminal device. The first transport equipment comprises processing circuitry configured to: receive traffic from a local terminal device intended for a remote terminal device; attempt to decode the traffic according to a first coding type to generate decoded traffic; determine an alignment status of the decoded traffic; and responsive to an alignment status of the decoded traffic indicating a loss of frame, attempt to decode the traffic according to a second coding type.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments described herein provide methods and apparatuses for automatically configuring a first transport equipment in an optical network.

Figure 1A:
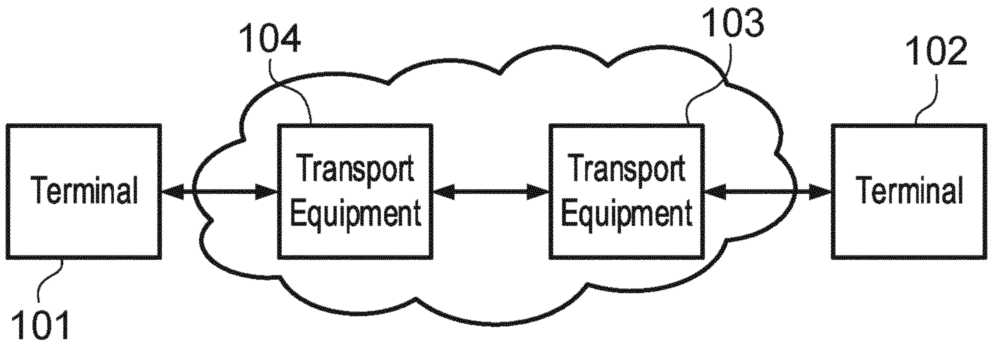
FIG. 1*a* illustrates a connection between a local terminal device and a remote terminal device via a first transport equipment and a second transport equipment.
Figure 1B:
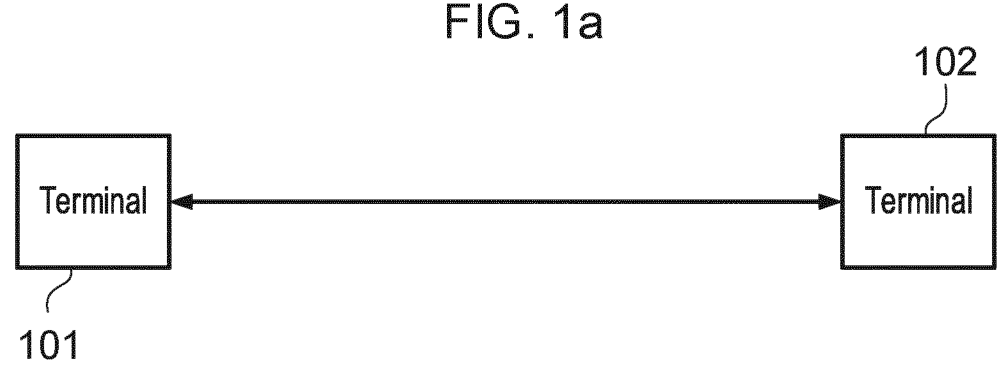
FIG. 1*b* illustrates how the local terminal device and remote terminal device view the connection between them.
Figure 2:
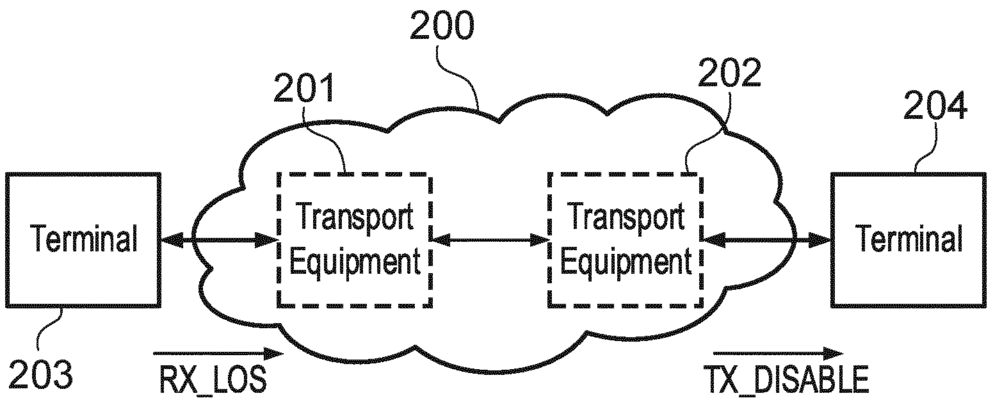
FIG. 2 illustrates an optical network comprising a first transport equipment and a second transport equipment.

FIG. 2 illustrates an optical network 200 comprising a first transport equipment 201 and a second transport equipment 202. The first transport equipment 201 and a second transport equipment 202 are coupled with an optical connection.

The first transport equipment 201 is connected to a local terminal device 203. In previous solutions the first transport equipment 201 would have been manually configured to achieve synchronization to the incoming data from the local terminal device 203.

Figure 3:
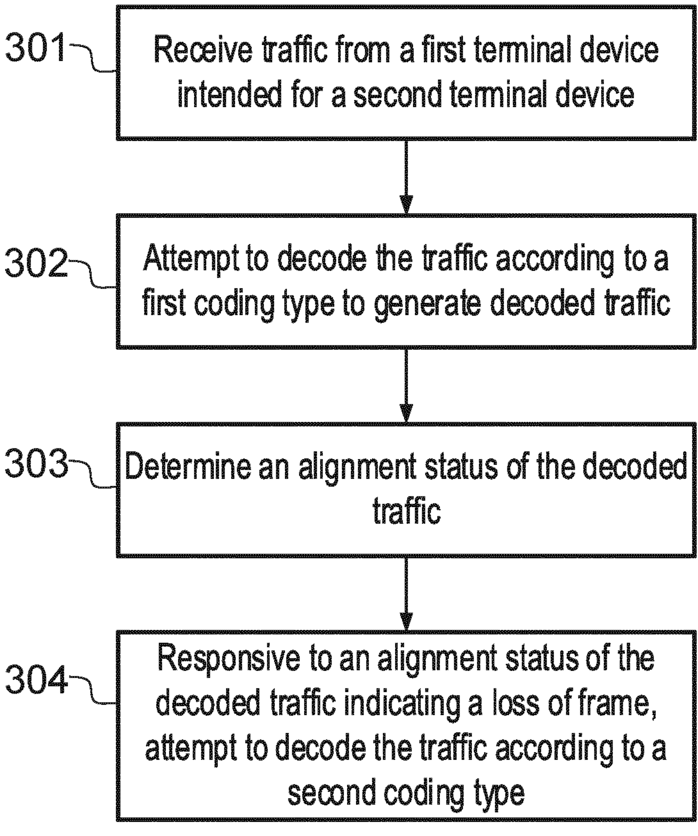
FIG. 3 illustrates a method in a first transport equipment for communicating with a second transport equipment in an optical network to transmit traffic between a local terminal device and a remote terminal device.

FIG. 3 illustrates a method in a first transport equipment 201 for communicating with a second transport equipment 202 in an optical network to transmit traffic between a local terminal device and a remote terminal device. It will be appreciated that the method of FIG. 3 may be utilized to automatically configure one or more ports of the first transport equipment. The method may for example be performed by the first transport equipment 201 illustrated in FIG. 2.

In step 301, the first transport equipment 201 receives traffic from a local terminal device 203 intended for a remote terminal device 204.

In step 302, the first transport equipment 201 attempts to decode the traffic according to a first coding type to generate decoded traffic. A coding type may comprise any coding pattern that may be used by a terminal device operating under any protocol. For example, a terminal device may be configured as a CPRI option 10 client which uses a coding type of RS-FEC scrambled with a PN-5280 sequence. In contrast traffic from a terminal device configured as a CPRI option 8 or 10GE client is coded with a coding type comprising 64b66b coding, while a terminal device configured as a GbE or CPRI option 7 client instead uses a coding type comprising 8b10b coding. It will be appreciated that there are many possible coding types that may be used by a terminal device beyond those listed here.

The first transport equipment may have access to a plurality of possible coding types that may be used by a terminal device. For example, the first transport equipment may be configured to access a table comprising a plurality of coding types. The table may be read in sequential order restarting from the beginning when reaching the end.

The coding types may for example, be listed in a table in order of likelihood that they will be used by a potential connected terminal device. For example, a particular coding type may be used more prolifically than another. The table may be read from the beginning when traffic starts to be received at the first transport equipment. Ordering the coding types in this manner may help to reduce the time taken to select a coding type that decodes the traffic received from the terminal device correctly.

In step 303, the first transport equipment, determines an alignment status of the traffic. For example, the alignment status may comprise an indication of whether or not there has been a loss of frame.

In step 304, responsive to an alignment states of the traffic indicating a loss of frame, the first transport equipment attempts to decode the traffic according to a second coding type. In other words, responsive to determining that the first coding type is not the correct coding type utilized by the local terminal device to encode the traffic, the first transport equipment tries to decode the traffic according to another coding type. The first transport equipment may therefore have the capability to try all of the possible coding types until an alignment is found with the incoming traffic. For example, the first transport equipment may be configured to attempt to decode the traffic according to a plurality of coding types in turn until it is determined that the alignment status of the decoded traffic indicates no loss of frame.

In some examples, responsive to a timer expiring and the alignment status indicating a loss of frame, the first transport equipment may be configured to select a next one of the plurality of coding types; attempt to decode the traffic using the next one of the plurality of coding types; and restart the timer. This process may be performed iteratively until the alignment status indicates that there is no loss of frame. The indication of no loss of frame indicates that the current coding type is providing the correct decoding of the traffic, ad so, responsive to the alignment status of the decoded traffic indicating no loss of frame and the timer expiring, the first transport equipment may continue to use the current coding type to decode the traffic.

In some examples, the first transport equipment may be configured to transmit an indication, to the remote terminal device, of whether traffic is being received from the local terminal device. This indication may be utilized by the remote terminal device to determine whether or not to turn on/off an optical module configured to transmit to the remote terminal device. For example, if the local terminal device is not transmitting, then in order to maintain transparency of the communication, the optical module configured to transmit to the remote terminal device should be turned off.

The first transport equipment may similarly receive an indication from the second transport equipment of whether traffic is being received from the remote terminal device. For example, the first transport equipment may receive an indication of whether traffic is being received at the second transport equipment from the remote terminal device, and responsive to the indication changing to indicate that traffic is not being received from the remote terminal device, disable an optical module configured to transmit to the local terminal device. Similarly, responsive to the indication changing to indicate that traffic is now being received at the second transport equipment from the remote terminal device, the first transport equipment may enable the optical module configured to transmit to the local terminal device.

In some examples, the first transport equipment may transmit an indication of a current alignment status and a current coding type to a second transport equipment in communication with the remote terminal device. This current status and current coding type may be utilized by the second transport equipment in the absence of any traffic being received by the second transport equipment from the remote terminal device.

Similarly, the first transport equipment may in some embodiments, receive, from the second transport equipment, an indication of a remote alignment status indicating whether the second transport equipment has decoded traffic from the remote terminal device with a loss of frame, and a current remote coding type. Responsive to not receiving traffic from the local terminal device, and the remote alignment status indicating that the second transport equipment has decoded traffic from the remote terminal device with no loss of frame, the first transport equipment may then select the current remote coding type to encode any traffic transmitted to the local terminal device.

In some examples, the local terminal device comprises a baseband unit, BBU. In some examples, the remote terminal device comprises a remote radio unit, RRC. In some examples, the first and second transport equipment communicate using an optical connection.

Figure 4:
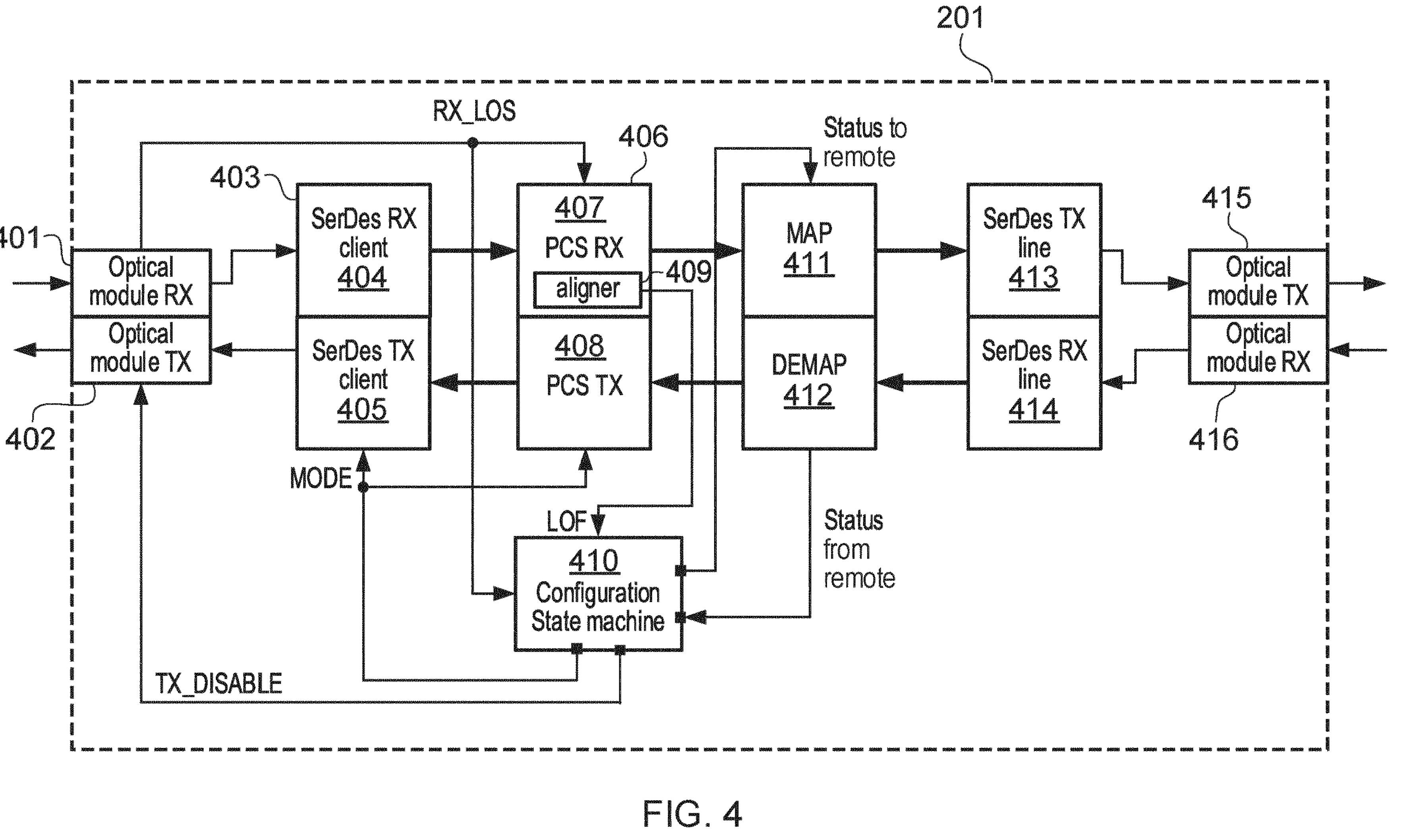
FIG. 4 illustrates an example of a first transport equipment according to some embodiments.

FIG. 4 illustrates an example of a first transport equipment 201 according to some embodiments. The transport equipment 201 may be configured to perform the method as described with reference to FIG. 3.

The transport equipment 201 comprises a first optical receiving module 401 for receiving traffic from a local terminal device (for example, the local terminal device 203), and a second optical transmitting module 402 for transmitting traffic to the local terminal device.

The transport equipment 201 further comprises a SerDes (Serial-Deserial) 403 which comprises a receiving SerDes, SerDes RX, 404 configured to perform serial to parallel conversion with clock and data recovery from the optical module, transmitting SerDes, SerDes TX, 405 configured to perform parallel to serial conversion of the data to be transmitted to the local terminal device by the transmitting optical module 402.

The SerDes 403 is configured to work at a certain data rate, for example a 25G Ethernet client has a nominal data rate of 25781.25 Mb/s, and a CPRI option 10 has a nominal data rate of 24330.24 Mb/s. The SerDes 403 may therefore select different data rates in turn until a correct data rate is found for the incoming traffic from the local terminal device.

The traffic converted by the SerDes RX may then be transmitted to a Physical Coding Sublayer (PCS) 406. The PCS 406 may comprise a receiving PCS (PCS RX) 407 and a transmitting PCS (PCS TX) 408. The PCS RX 407 may comprise an aligner 409 configured to determine whether a current coding type currently being used by the PCS RX 407 is correct. For example, the aligner may determine the alignment status of the decoded traffic.

If the aligner 409 determines that a current coding type being used by the PCS RX 407 is correct, for example, because the decoded traffic is aligned, then the aligner may set the alignment status of the decoded traffic to indicate that there is no loss of frame. For example, the aligner may set the value LOF to 0, which is used in the examples described. If the aligner detects that the current coding type is not correct, for example, because the decoded traffic is not aligned, then the aligner may set the alignment status of the decoded traffic to indicate that there is a loss of frame. For example, the aligner may set the value LOF to 1, which is used in the examples described.

For example therefore, the PCS RX 407 may be able to align different coding types (e.g.: 8b10b, 64b66b, RS-FEC) and signal the lock status (or alignment status). In this example, when LOF=1, the PCS RX 407 has not reached the synchronization to the incoming traffic.

A configuration state machine 410 may be configured to control the operation of the PCS 406 and/or the SerDes 403. In particular, the configuration state machine 410 may be configured to cycle different operating modes in each operating mode, MODE, a different coding type and, in some examples, a different data rate may be selected. After a change in operating mode, a timer may be set, and the operating mode may then not change until after the timer has expired. When the timer expires, the configuration state machine 409 may check the current alignment status of the PCS RX 407, and responsive to the alignment status indicating a loss of frame (e.g. is LOF=1), the configuration state machine 410 may change to the next operating mode.

The decoded traffic is transmitted to a mapper, MAP, 411 which encapsulates the data. For example, the decoded traffic may be encapsulated to ATF11 or Radio over Ethernet (RoE). The MAP 411 may also receive an indication of the current coding type being used by the PCS RX 407 and the current alignment status from the configuration state machine 410. The current alignment status and current coding type may also be encapsulated into the data by the MAP 411.

In other words, the overhead of the encapsulated data may comprise information relating to the alignment status and the coding type of the first transport equipment (e.g. LOS, LOF, data rate, coding type, etc.).

The MAP 411 may utilise the status received from the configuration state machine to configure the correct mapping.

The configuration state machine 410 may also transmit an indication of whether traffic is being received from the local terminal device to the MAP 411. For example, the configurations state machine may receive a flag RX_LOS from the receiving optical module 401 which may be set to 1 in the absence of received power from the local terminal device, i.e. when the client (device) is not transmitting to the equipment (RX_LOS=1).

The encapsulated data may then be transmitted to a transmitting SerDes 413 for conversion before being sent to the second transport equipment 202 by the transmitting optical module 415.

The receiving optical module 416 may receive data from the second transport equipment 202. This may then be converted by the SerDes RX 414 and de-mapped by the DEMAP 412. The DEMAP 412 may extract from the data one or more of: a remote current coding type, R_MODE (indicating the current coding type being used by the second transport equipment), a remote current alignment status, R_LOF, (indicating whether the second transport equipment has found the correct configuration for decoding the traffic being received from the remote terminal device) and an indication of whether the second transport equipment is receiving traffic from the remote terminal device, R_LOS (for example, a flag R_LOS may be set to 1 if no data is being received from the remote terminal device). The DEMAP 412 may use the alignment status received on the overhead to configure the correct client de-mapping.

The remote current coding type, remote current alignment status, and indication of whether the second transport equipment is receiving traffic from the remote terminal device, may be transmitted from the second transport equipment to the configuration state machine 410 for use in determining control of the PCS 406, SerDes 403 and/or the transmitting optical module 402.

The traffic extracted by the DEMAP 411 may be transmitted to the PCS TX 408 for encoding using the current coding type. The coded data may then be transmitted to the SerDes TX for parallel to serial conversion and for transmitting to the local terminal device by the transmitting optical module 402.

The configuration state machine may therefore receive the following inputs: RX_LOS from receiving optical module 401, LOF from aligner 409; R_LOS, R_LOF and R_MODE from the second transport equipment.

The configuration state machine 410 may then provide the following outputs: MODE to client SerDes and PCS. LOS, LOF and MODE may be transmitted by line overhead to the second transport equipment; and TX_DISABLE to optical module. The following table illustrates the functionality of the configuration state machine 410.

TABLE 1

Configuration State Machine

| Inputs (client status) | | Inputs (from line overhead, remote status) | | | Outputs | |
|---|---|---|---|---|---|---|
| RX_ LOS | LOF | R_ LOS | R_ LOF | R_ MODE | MODE | TX_ DISABLE |
| 1 | x | 1 | x | x | Stay on the current state | 1 |
| 1 | x | 0 | 1 | x | Stay on the current state | 0 |
| 1 | x | 0 | 0 | mode_r | Change to mode_r | 0 |
| 0 | 1 | 1 | x | x | Change to next mode in table | 1 |
| 0 | 1 | 0 | x | x | Change to next mode in table | 0 |
| 0 | 0 | 1 | x | x | Stay on the current state | 1 |
| 0 | 0 | 0 | x | x | Stay on the current state | 0 |

x = either value 1 or value 0. The output remains the same in either scenario

R_LOS indicates the Loss Of Signal of the remote client (terminal device) when R_LOS=1, R_LOF indicates the Loss Of Frame of the remote client (terminal device) when R_LOF=1, and R_MODE indicates the current operating mode of the remote client. RX_LOS indicates the Loss Of Signal from the local terminal device (RX_LOS=1 indicates that the signal/traffic is lost).

In summary, when traffic is being received from the local terminal device, considered as RX_LOS=0, the configuration state machine 410 may be configured to change to a new MODE after a timer has expired if the current MODE has not achieved synchronisation, e.g. when LOF (Loss of Frame)=1, otherwise, the current MODE is maintained if synchronization is achieved, e.g. when LOF=0. As such, the first transport equipment receives traffic from a local terminal device intended for a remote terminal device. The first transport equipment attempts to decode the traffic according to a first coding type to generate decoded traffic, and determines an alignment status (LOF) of the decoded traffic. If the alignment status of the decoded traffic indicates a loss of frame (LOF=1), the first transport equipment attempts to decode the traffic according to a second coding type, i.e. the decoding mode and/or data rate is changed. Aspects of the disclosure may relate to any of the actions (outputs) based on the Loss of Signal and/or Loss of Frame and/or mode indicated by the Table 1 and present disclosure.

Each mode may be associated with a different length of timer, depending on the PCS maximum lock times. The typical lock times (for achieving synchronization and no loss of frame) are in the range of milliseconds; longer times when FEC is enabled. Since the terminal device rates typically change at a much slower rate (seconds), the configuration state machine 410 should react with a speed that will not impact the rate negotiation process of the terminal devices. The time needed to achieve alignment depends on the client type of the local terminal device. First, after a configuration change, the SerDes itself takes some time to complete the reconfiguration. Then, The PCS RX takes some time to find a correct alignment, such as commas on 8b10b coding, or header sync sequences on 64b66b coding. As previously mentioned, alignment to clients with FEC can last longer; however typical lock times are in the order of some milliseconds.

When traffic is not being received from the local terminal device, e.g. RX_LOS=1, and the remote is locked, e.g. R_LOF=0, the MODE for the state machine will change to the remote configuration, R_MODE. This may be useful when the first transport equipment is connected to a CPRI slave port, for instance, and it can then take the configuration from the second transport equipment that is connected to the CPRI master port.

When the second transport equipment is indicating that it is not receiving traffic from the remote terminal device, e.g. when R_LOS=1, the configuration state machine 410 may set the TX_DISABLE signal to 1 to disable the transmitting optical module 402 in order to emulate the remote terminal device behaviour. This behaviour enables the system to act as if the local terminal device and remote terminal device were directly connected, without the transport equipment connecting them.

With this solution both the SerDes 403 and the PCS 406 are configured by a configuration state machine 410. The digital logic of the configuration state machine 410 may be implemented in FPGA or ASIC.

It will also be appreciated that the first transport equipment 201 may receive traffic from a plurality of local terminal devices and may group the data and alignment statuses from the plurality of local terminal devices utilizing multiplexing and/or switching methods. The traffic from the plurality of terminal devices may then be transmitted over the optical link between the first transport equipment and the second transport equipment, and de-multiplexed by the second transport equipment.

Figure 5:
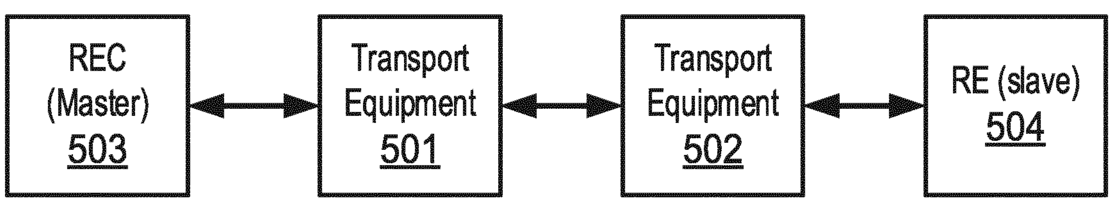
FIG. 5 illustrates an example in which communication takes place between a master device and a slave device.

FIG. 5 illustrates an example in which communication takes place between a master device 501 and a slave device 502.

In this example, the master device 501 transmits traffic at various CPRI rates. The rate changes, for example, after 0.9 to 1.1 seconds.

The slave device 502 tries to receive the traffic at various CPRI rates. The rate at the slave device changes, for example, after 3.9-4.1 seconds. The slave switches off the laser transmitting to the second transport equipment until it becomes synchronized with the traffic from the master device 501. The second transport equipment 504 will indicate to the first transport equipment 503 that the laser from the slave device has been switched off, for example, by transmitting R_LOS=1 to the first transport equipment 503.

The first transport equipment 503 may then turn off the laser towards the master device 501.

The first transport equipment 503 changes coding type at each master change (virtually with no delay) and send the indication of the current coding type to the second transport equipment 504.

The second transport equipment 504, as it is not receiving information from the slave device 502, may implement the remote current coding type received from the first transport equipment 503. When the slave device then reaches synchronization, the slave device turns back on the laser and start to transmit using the rate and coding type currently transmitted by master. As the second transport equipment has already changed to the remote current coding type it does not need to change configuration.

Figure 6:
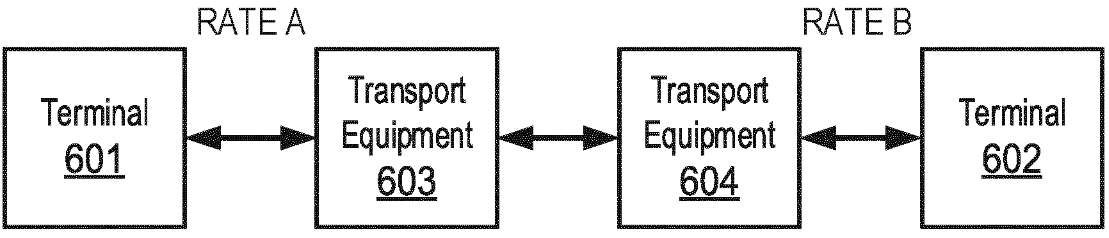
FIG. 6 illustrates a diagnostic use of a configuration state machine.

FIG. 6 illustrates a diagnostic use of a configuration state machine.

In this example, if the local terminal device 601 and the remote terminal device 602 are not compatible, the first transport equipment 603 and second transport equipment 604 may lock to different coding types. In this case both the first transport equipment and the transport equipment will receive a remote indication of a coding type (R_MODE) used by the other transport equipment. Each state machine will then have a mismatch of MODE and R_MODE and can rise an alarm to signal the error.

Figure 7:
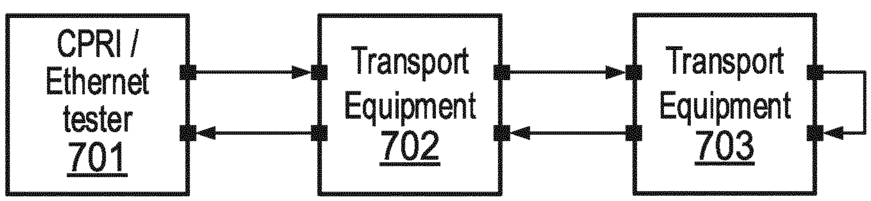
FIG. 7 illustrates a testing use of the configuration state machine.

FIG. 7 illustrates a testing use of the configuration state machine.

In this example, the tester 701 (CPRI, Ethernet or other instrument type) transmits data. The first transport equipment 702 changes coding type, MODE, until it reaches synchronization (LOF=0) with the data transmitted by the tester. The second transport equipment may then also change coding type until it reaches synchronization with the data looped that is back. If the coding types used by the first transport equipment and the second transport equipment are different, then the data looped back will be corrupted. When both coding types are the same, the state machines in each transport equipment will stop changing. When switching off laser from the tester 701, both the first transport equipment 702 and the second transport equipment 703 will switch off their lasers.

Embodiments described herein therefore provide methods and apparatuses for providing automatic reconfiguration of a transport equipment in an optical network.

Figure 8:
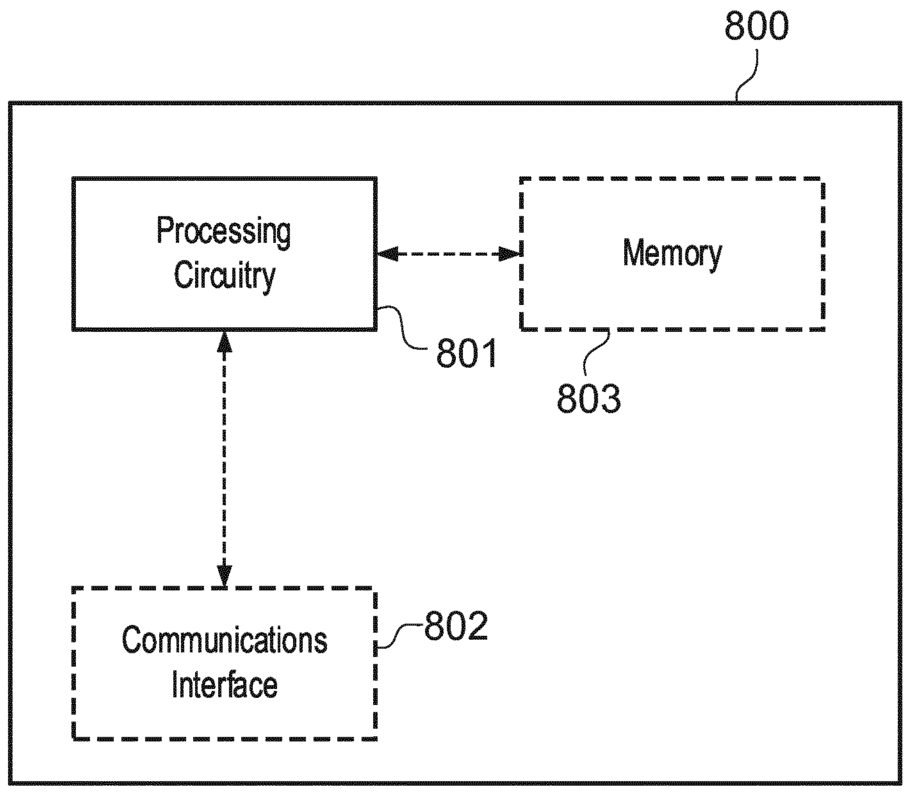
FIG. 8 illustrates a first transport equipment comprising processing circuitry (or logic).

FIG. 8 illustrates a first transport equipment 800 comprising processing circuitry (or logic) 801. The processing circuitry 801 controls the operation of the first transport equipment 800 and can implement the method described herein in relation to an first transport equipment 800. The processing circuitry 801 can comprise one or more processors, processing units, multi-core processors or modules that are configured or programmed to control the first transport equipment 800 in the manner described herein. In particular implementations, the processing circuitry 801 can comprise a plurality of software and/or hardware modules that are each configured to perform, or are for performing, individual or multiple steps of the method described herein in relation to the first transport equipment 800.

Briefly, the processing circuitry 801 of the first transport equipment 800 is configured to: receive traffic from a local terminal device intended for a remote terminal device; attempting to decode the traffic according to a first coding type to generate decoded traffic; determining an alignment status of the decoded traffic; and responsive to an alignment status of the decoded traffic indicating a loss of frame, attempting to decode the traffic according to a second coding type.

In some embodiments, the first transport equipment 800 may optionally comprise a communications interface 802. The communications interface 802 of the first transport equipment 800 can be for use in communicating with other nodes, such as other virtual nodes. For example, the communications interface 802 of the first transport equipment 800 can be configured to transmit to and/or receive from other nodes requests, resources, information, data, signals, or similar. The processing circuitry 801 of first transport equipment 800 may be configured to control the communications interface 802 of the first transport equipment 800 to transmit to and/or receive from other nodes requests, resources, information, data, signals, or similar.

Optionally, the first transport equipment 800 may comprise a memory 803. In some embodiments, the memory 803 of the first transport equipment 800 can be configured to store program code that can be executed by the processing circuitry 801 of the first transport equipment 800 to perform the method described herein in relation to the first transport equipment 800. Alternatively or in addition, the memory 803 of the first transport equipment 800, can be configured to store any requests, resources, information, data, signals, or similar that are described herein. The processing circuitry 801 of the first transport equipment 800 may be configured to control the memory 803 of the first transport equipment 800 to store any requests, resources, information, data, signals, or similar that are described herein.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a first transport equipment for an optical network for communicating with a second transport equipment in an optical network to transmit traffic between a local terminal device and a remote terminal device, the method comprising:

- receiving traffic from a local terminal device intended for a remote terminal device;
- attempting to decode the traffic according to a first coding type to generate decoded traffic;
- determining an alignment status of the decoded traffic; and
- responsive to an alignment status of the decoded traffic indicating a loss of frame, attempting to decode the traffic according to a second coding type;

wherein the method further comprises receiving from the second transport equipment, on line overhead, an indication of a remote alignment status indicating whether the second transport equipment has decoded traffic from the remote terminal device with a loss of frame, and a current remote coding type.

2. The method of claim 1, further comprising:

- attempting to decode the traffic according to a plurality of coding types in turn until it is determined that the alignment status of the decoded traffic indicates no loss of frame.

3. The method of claim 2, further comprising:

responsive to a timer expiring and the alignment status indicating a loss of frame:

selecting a next one of the plurality of coding types;

attempting to decode the traffic using the next one of the plurality of coding types; and restarting the timer.

4. The method of claim 2, further comprising:

responsive to the alignment status of the decoded traffic indicating no loss of frame and a timer expiring, continuing to use a current coding type to decode the traffic.

5. The method of claim 2, wherein each of the plurality of coding types comprises one or more of:

RS-FEC, scrambled with a PN-5280 sequence;

64b66b coding; and

8b10b coding.

6. The method of claim 1, further comprising:

transmitting an indication, to the remote terminal device, of whether traffic is being received from the local terminal device.

7. The method of claim 1, further comprising:

transmitting an indication of a current alignment status and a current coding type to the second transport equipment in communication with the remote terminal device.

8. The method of claim 1, further comprising:

receiving an indication of whether traffic is being received at the second transport equipment from the remote terminal device, and responsive to the indication changing to indicate that traffic is not being received from the remote terminal device, disabling an optical module configured to transmit to the local terminal device.

9. The method of claim 8, further comprising:

responsive to the indication changing to indicate that traffic is now being received at the second transport equipment from the remote terminal device, enabling the optical module configured to transmit to the local terminal device.

10. The method of claim 1, further comprising:

responsive to not receiving traffic from the local terminal device, and the remote alignment status indicating that the second transport equipment has decoded traffic from the remote terminal device with no loss of frame, selecting the current remote coding type to encode any traffic transmitted to the local terminal device.

11. The method of claim 1, wherein the local terminal device comprises a baseband unit (BBU) and wherein the remote terminal device comprises a remote radio unit (RRU).

12. A first transport equipment for an optical network, wherein the first transport equipment is configured to communicating with a second transport equipment in an optical network to transmit traffic between a local terminal device and a remote terminal device, the first transport equipment comprising processing circuitry configured to:

receive traffic from a local terminal device intended for a remote terminal device;

attempt to decode the traffic according to a first coding type to generate decoded traffic;

determine an alignment status of the decoded traffic; and responsive to an alignment status of the decoded traffic indicating a loss of frame, attempt to decode the traffic according to a second coding type;

wherein the processing circuitry is further configured to receive from the second transport equipment, on line overhead, an indication of a remote alignment status indicating whether the second transport equipment has decoded traffic from the remote terminal device with a loss of frame, and a current remote coding type.

13. The first transport equipment of claim 12, wherein the processing circuitry is further configured to:

attempt to decode the traffic according to a plurality of coding types in turn until it is determined that the alignment status of the decoded traffic indicates no loss of frame.

14. The first transport equipment of claim 13, wherein the processing circuitry is further configured to:

responsive to a timer expiring and the alignment status indicating a loss of frame:

select a next one of the plurality of coding types;

attempt to decode the traffic using the next one of the plurality of coding types; and restart the timer.

15. The first transport equipment of claim 13, wherein the processing circuitry is further configured to:

responsive to the alignment status of the decoded traffic indicating no loss of frame and a timer expiring, continue to use a current coding type to decode the traffic.

16. The first transport equipment of claim 13, wherein each of the plurality of coding types comprises one or more of:

RS-FEC, scrambled with a PN-5280 sequence;

64b66b coding; and

8b10b coding.

17. The first transport equipment of claim 12, wherein the processing circuitry is further configured to:

transmit an indication, to the remote terminal device, of whether traffic is being received from the local terminal device.

18. The first transport equipment of claim 12, wherein the processing circuitry is further configured to:

transmit an indication of a current alignment status and a current coding type to the second transport equipment in communication with the remote terminal device.

19. The first transport equipment of claim 12, wherein the processing circuitry is further configured to:

receive an indication of whether traffic is being received at the second transport equipment from the remote terminal device, and responsive to the indication changing to indicate that traffic is not being received from the remote terminal device, disable an optical module configured to transmit to the local terminal device.

20. The first transport equipment of claim 19, wherein the processing circuitry is further configured to:

responsive to the indication changing to indicate that traffic is now being received at the second transport equipment from the remote terminal device, enable the optical module configured to transmit to the local terminal device.

21. The first transport equipment of claim 20, wherein the processing circuitry is further configured to:

responsive to not receiving traffic from the local terminal device, and the remote alignment status indicating that the second transport equipment has decoded traffic from the remote terminal device with no loss of frame, select the current remote coding type to encode any traffic transmitted to the local terminal device.

22. The first transport equipment of claim 12, wherein the local terminal device comprises a baseband unit (BBU) and the remote terminal device comprises a remote radio unit (RRU).

* * * * *